United States Patent [19]

Maine

[11] 4,453,165
[45] Jun. 5, 1984

[54] DIFFERENTIAL DOPPLER RECEIVER

[75] Inventor: Reuben E. Maine, Charlottesville, Va.

[73] Assignee: Sperry Corporation, New York, N.Y.

[21] Appl. No.: 455,433

[22] Filed: Jan. 3, 1983

[51] Int. Cl.³ .......................... G01S 5/02; G01S 3/52
[52] U.S. Cl. .................................................... 343/418
[58] Field of Search ............. 343/356, 402, 405, 418; 324/78 R, 79 R

[56] References Cited

U.S. PATENT DOCUMENTS 3,996,590 12/1976 Hammack .......................... 364/460
4,414,504 11/1983 Kennedy ........................... 324/83 R Primary Examiner—Theodore M. Blum Attorney, Agent, or Firm—Howard P. Terry; Seymour Levine

[57] ABSTRACT

A receiver accurately measures the Doppler shift of a radio signal from a transmitter having a known frequency and moving with respect to the receiver by using the signal from another transmitter of known frequency as a reference. The signals from the two transmitters are received by a single antenna, separated, and processed in separate channels. In a typical application using Global Positioning System satellite signals, each signal is discretely extracted by auto-correlation with its own pseudorandum noise signal, filtered, amplified, and applied to second mixers in phase locked loops in the respective channels. The two resulting second IF signals are applied to an output mixer whereupon the resulting difference output signal represents the difference in frequency between the two Doppler signals.

9 Claims, 1 Drawing Figure

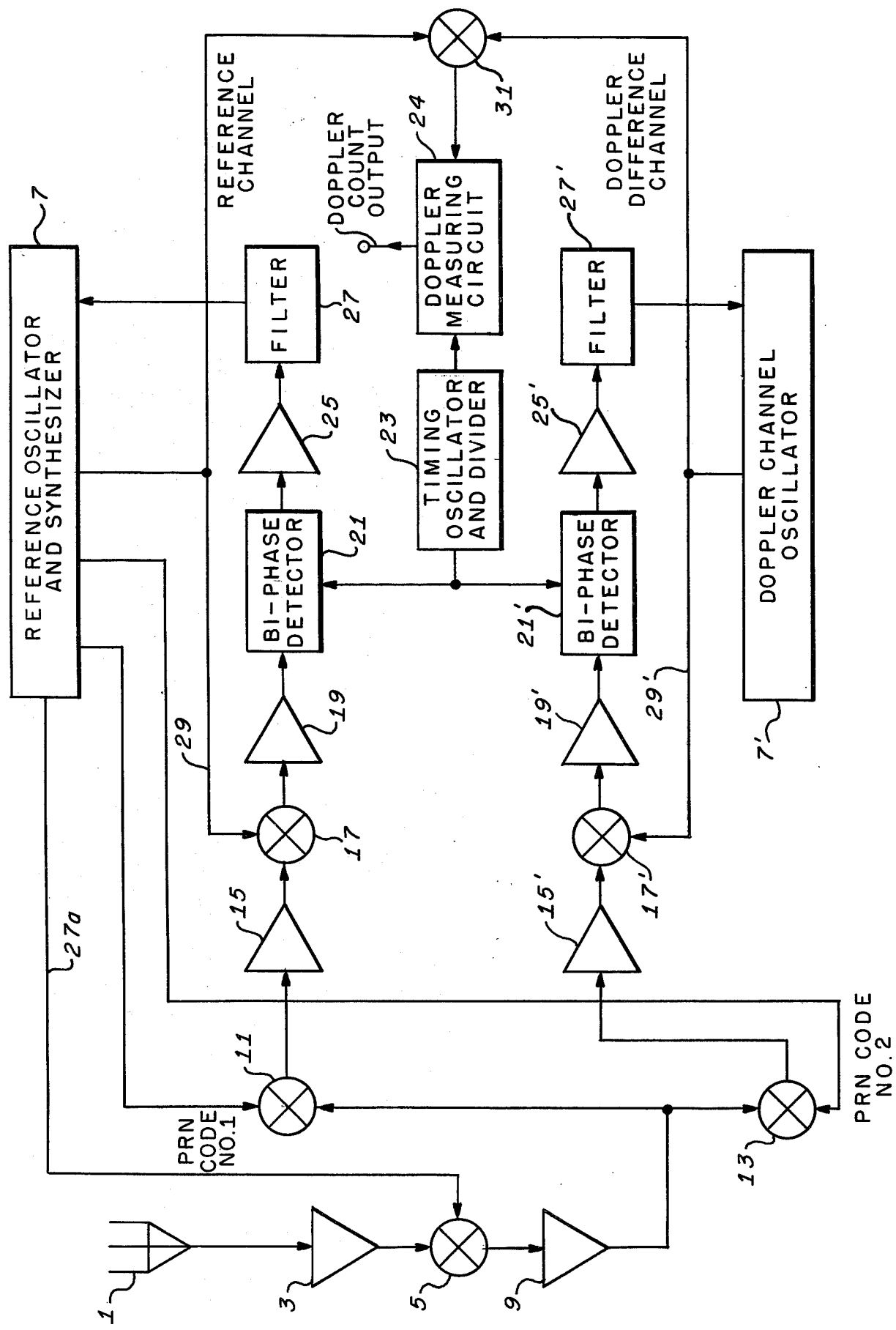

4,453,165

DIFFERENTIAL DOPPLER RECEIVER

BACKGROUND OF THE INVENTION

1. Field of the Invention

The present invention relates generally to electronic navigation systems and more specifically to radio receivers for use in such systems.

2. Description of the Prior Art

Various electronic navigation systems are well known in the art. Loran systems, for instance, have found wide acceptance and have proven to be a valuable aid to navigation. More recently, a Global Positioning Systems (GPS) has been proposed wherein a constellation of satellites will be positioned in orbit around the earth. Each satellite transmits data which is modulated by pseudorandom noise code (PRN) peculiar to that satellite, thus resulting in a spread spectrum transmission which can be identified and processed by the user to determine his position. Such a system is described, for instance, in co-pending U.S. patent application Ser. No. 321,945 entitled "Global Positioning System Receiver", filed Nov. 16, 1981 and assigned to the applicant's assignee.

The receiver of the present invention retains the advantages of prior GPS receivers but provides the ability to make very accurate frequency measurements without requiring a precision local oscillator.

SUMMARY OF THE INVENTION

A receiver for use in an electronic navigation system accurately measures the Doppler frequency of a radio signal from a transmitter that is moving with respect to the receiver by using another transmitter having a stable and precisely known frequency as a reference. The signals from the two sources are processed in a differential mode so as to eliminate the need for a highly precise timing clock in the receiver.

BRIEF DESCRIPTION OF THE DRAWING

The sole FIGURE is a block diagram of a receiver employing the principles of the present invention.

DESCRIPTION OF THE PREFERRED EMBODIMENT

The FIGURE illustrates a presently preferred embodiment of the invention intended for use in a Global Positioning System.

Two radio frequency spread spectrum signals emanating from transmitters on board selected satellites are received by the antenna 1. The received signals are amplified in an RF amplifier 3 and applied to a mixer 5 where they are heterodyned with a first local oscillator signal from the reference oscillator and synthesizer 7 to be explained. The resulting first IF signal from the mixer 5 is amplified in a wideband amplifier 9 and applied to known types of correlators 11 and 13 in the receiver's reference and Doppler difference channels.

It should be understood that the signal transmitted by each satellite is modulated by a PRN code signal peculiar to that satellite. In accordance with known techniques, locally generated PRN code signals corresponding to those generated in the transmitters of the satellites in question are applied to the respective correlators which serve as "despread modulators" that discretely extract the desired information from the IF signal.

The manner in which the individual spread spectrum signals are generated and demodulated are described in a book written by R. C. Dixon entitled *Spread Spectrum Systems* and published by John Wiley & Sons in 1976.

As explained in that book, a typical transmitter includes a carrier source that generates a sinusoidal RF carrier which is modulated with a binary information code stream by means of a PRN generator that actuates a balanced modulator. The resulting modulated carrier consists of a sinusoidal wave whose phase is reversed 180° when the binary level of the modulating wave is reversed. In the receiver, a PRN generator provides a code stream that is a replica of the binary code stream generated in the transmitter. The locally generated code stream is applied to a correlator so as to recover the RF carrier from the received wave.

The reference channel of the receiver depicted in the FIGURE, as presently preferred, employs the principles of the invention described in the previously mentioned copending U.S. patent application Ser. No. 321,945.

The despread signal from the correlator 11 is applied to a phase locked loop which includes a narrow band first IF amplifier 15 through which the signal is applied to a second mixer which heterodynes the despread signal with a second local oscillator signal derived from the reference oscillator and synthesizer 7. Typically, the reference oscillator is adjusted to provide an IF output signal from the mixer 17 having a frequency of 1 KHz. This IF signal is passed through a narrow band IF amplifier 19. The output of the amplifier 19 is essentially a 1 KHz representation of the carrier signal from which the PRN modulation has been removed by the correlator and the sidebands, noise and interference have been attenuated by the narrow bandpass characteristics of the amplifiers 15 and 19.

The signal from the amplifier 19 is applied to a bi-phase detector 21 along with a signal from a timing oscillator 23 having the same nominal frequency as the signal from the amplifier 19 (1 KHz under the assumed conditions).

Preferably the bi-phase detector 21 is of the type described in co-pending U.S. patent application Ser. No. 239,084, entitled "Bi-phase Detector", filed Feb. 27, 1981 and assigned to applicant's assignee. This type of detector includes a D-type flip-flop and two exclusive OR gates to produce a phase control voltage which locks the 1 KHz reference signal from the timing oscillator and divider 23 to the receiver output signal from the amplifier 19. The bi-phase detector effectively compares the phases of the receiver output signal and the reference signal and produces an output that is passed through a d.c. amplifier 25 and a phase locked loop filter 27 to the reference oscillator and synthesizer 7.

As explained in co-pending patent application Ser. No. 321,945, the reference oscillator in the unit 7 includes a voltage controlled oscillator which uses the output signal from the filter 27 as an automatic frequency control signal.

The output of the voltage controlled oscillator is applied to frequency multiplying means so as to provide a first signal suitable for use as a local oscillator signal for the mixer 5 and a second signal suitable for use as a local oscillator signal in the second mixer 17. These local oscillator signals are applied to the first and second mixers via lines 27a and 29 respectively.

Also in accordance with the detailed teachings of the same patent application, the reference oscillator and synthesizer unit 7 contains a straightforward code generator programmed to supply suitable PRN code signals to the correlators 11 and 13. Typically, the unit may contain straightforward microprocessing means programmed to adjust a phase shifter so as to achieve and maintain time correlation between the locally generated PRN code and the received code.

The Doppler difference channel contains a phase locked loop similar to that in the reference channel. The various elements in the reference channel have been designated by primes in the FIGURE corresponding to the basic numbers used to identify the same elements in the reference channel.

The Doppler channel oscillator 7′ differs from its counterpart 7 in the reference channel in that it does not include a synthesizing means and provides only a second local oscillator signal. The code generating means in the reference oscillator and synthesizer unit 7 conveniently provides both the PRN #1 and PRN #2 code signals. Furthermore, since the mixer 5 processes both incoming signals, the first local oscillator signal from the unit 7 serves both the reference channel and the Doppler difference channel.

The second local oscillator signals from the reference and Doppler channels are also applied to a mixer 31 via the lines 29 and 29′. The mixer serves to extract the difference in frequency between these two signals and couples the difference frequency to a suitable frequency measuring circuit. Any one of a wide variety of frequency measuring circuits may be used for this purpose, but as will be explained, it is usually convenient to compare the difference frequency with a signal from the timing oscillator and divider so as to accommodate the large range of frequency differences that might occur and to reflect the fact that either of the two signals applied to the mixer 31 may represent the higher of the two frequencies.

As an aid to understanding the invention, consider a typical application of the receiver in which signals from remote sources having carrier frequencies of 1575.42 MHz are to be received. Each of these transmitted signals would be modulated by its peculiar PRN code and the frequency of the signals as received would be modified by Doppler shifts dependent upon the relative motion between the transmitters and the receiver.

For this application local oscillators in the reference and Doppler difference channels might provide a common GPS base frequency ("F") of 10.23 MHz in the phase locked condition. For ease of explanation, the received signals under the assumed conditions may be designated as having frequencies of $154F+D_1$ and $154F+D_2$, respectively, where "D" represents the individual Doppler shifts.

The reference and Doppler channel oscillators further contain multiplier means to provide suitable local oscillator signals to the first and second mixers. For the conditions being considered, the local oscillator output in the reference channel is multiplied by a factor of 147 to provide a frequency of 1503.81 MHz to the first mixer 5. The local oscillator output in both channels is also multiplied by a factor of 7 to provide signals of 71.61 MHz to the second mixers 17 and 17′ in each channel.

The reference channel is phase locked to the 1 KHz local reference signal and produces a first local oscillator signal having a frequency of:

$$147F+(147/154)\times D_1-(147/154)\times 1 \text{ KHz or:}$$

$$147F+21/22\times D_1-21/22\times 1 \text{ KHz} \tag{1}$$

This local oscillator signal is subtracted from the received RF signal in the first mixer producing a first IF signal of:

$$7F\times 1/22\times D_1-21/22\times 1 \text{ KHz} \tag{2}$$

The second local oscillator frequency is exactly 1/21 of the first local oscillator, or:

$$7F+1/22\times D_1-1/22\times 1 \text{ KHz} \tag{3}$$

The second local oscillator signal (3) is subtracted from the first IF signal in the second mixer and produces a second IF of exactly 1 KHz since it is phase locked to the 1 KHz timing reference.

The Doppler difference channel utilizes the IF resulting from the interaction of the received signal and the first local oscillator signal produced by the oscillator in unit 7 of the reference channel. The IF signal applied to the second mixer 17′ in the Doppler difference channel is:

$$7F+D_2-21/22\times D_1+21/22\times 1 \text{ KHz} \tag{4}$$

The second local oscillator signal in the Doppler difference channel is phase locked in the same manner as that in the reference channel and may be represented as:

$$7F+D_2-21/22\times D_1-1/22\times 1 \text{ KHz} \tag{5}$$

The mixer 31 subtracts the local oscillator signal (3) in the reference channel from the local oscillator signal (5) in the Doppler difference channel and produces an output signal equal to $(D_2-D_1)$ which is applied to the Doppler measuring circuit.

The particular Doppler measuring circuit used in conjunction with the invention is largely a matter of choice in design.

However, since the value of $D_2-D_1$ can be positive, negative or even zero, it is convenient to phase lock the Doppler difference channel on the opposite side of the received signal so that a Doppler difference output of $D_2-D_1+2$ KHz will be obtained.

Since the resulting output signal represents the difference in frequency between two signals received from precisely controlled transmitters, the need for a highly precise local oscillator is eliminated.

Although the invention has been described with reference to GPS techniques, it will be appreciated that this represents only one of a number of possible systems in which Doppler differential frequencies may be utilized. Similarly, the particular receiver discussed in this description was chosen as an example. Other types of GPS receivers may be used in practicing the invention.

When used as a navigation aid, the receiver of the present invention may be used for accurately determining the velocity of the craft in which the receiver is installed when the position of the craft is known or for determining position when the velocity is known.

While the invention has been described in its preferred embodiments, it is to be understood that the words which have been used are words of description rather than of limitation and that changes may be made within the purview of the appended claims without departing from the true scope and spirit of the invention in its broader aspects.

I claim:

1. A differential Doppler receiver comprising antenna means for simultaneously receiving radio frequency signals from first and second relatively moveable remote transmitters having the same base frequency, said receiver including means for separating the signals from the first and second transmitters from the combined received signal, a reference channel for processing one of the separated signals and a Doppler difference channel for processing the other separated signal, said receiver further containing timing oscillator means, each of said channels including a phase locked loop in which a voltage controlled oscillator is regulated in accordance with the magnitude of the signal flowing in that loop, each of said phase locked loops further including means for heterodyning the separated signal flowing in that loop with a local oscillator signal derived from the voltage controlled oscillator in that loop, said voltage controlled oscillator being adjusted so that in the phase locked condition the signal from the heterodyning means is equal in phase and frequency to the signal from said timing means, said receiver further containing means to provide an output signal representative of the difference in frequency between the two local oscillator signals.

2. The receiver of claim 1 in which the remote sources are mounted in satellites in a Global Positioning System and the signals from such sources are modulated by pseudorandom noise signals.

3. The receiver of claim 2 further including mixer means for heterodyning the combined received signals with an additional local oscillator signal derived from the output of the voltage controlled oscillator in said reference channel.

4. The receiver of claim 3 in which the means for separating the signals from the combined received signal includes first and second correlators each coupled to receive the output of said mixer means, said first and second correlators being connected to respond to locally generated pseudorandom noise signals that are replicas of the pseudorandum noise modulation applied to the signals in the first and second sources respectively, said first and second correlators further being coupled to introduce their resultant despread signals into the phase locked loops of the reference and Doppler difference channels respectively.

5. The receiver of claim 4 further characterized in that the despread signals from the correlators in each channel are passed through narrow bandpass amplifying means to attenuate noise and extraneous sidebands in the phase locked loop signals.

6. The receiver of claim 5 further including means to lock the phase of the signal from said bandpass amplifying means in each channel to the phase of the signal from said timing oscillator.

7. The receiver of claim 6 further characterized in that the phase locking means in each channel includes a bi-phase detector.

8. The receiver of claim 1 further characterized in that said means to provide an output signal includes an output mixing means coupled to receive local oscillator signals from each channel whereby the frequency of the output signal from that mixer is equal to the difference in frequency between the two local oscillator signals.

9. The receiver of claim 8 further including means to add the frequency difference signal from said mixer to a signal derived from said timing oscillator means whereby a positive output signal may be obtained regardless of the relative frequencies of the local oscillator signals.

* * * * *